June 11, 1929. P. N. SEA 1,717,069
AUTOMOBILE STEERING POST ATTACHMENT
Filed June 27, 1927  2 Sheets-Sheet 1
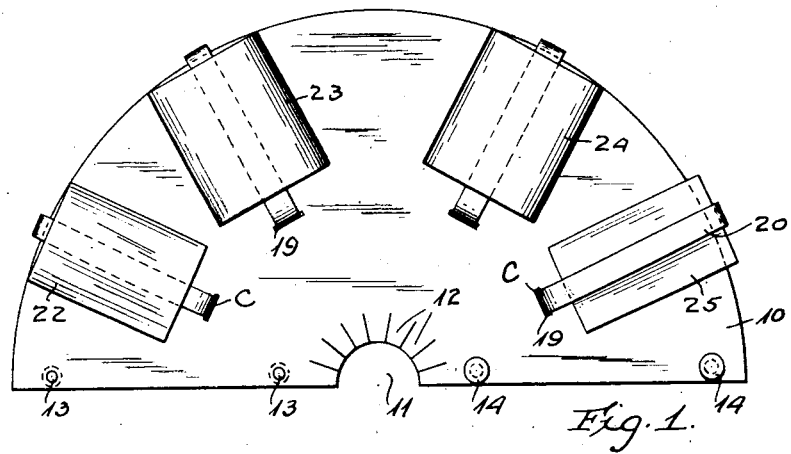
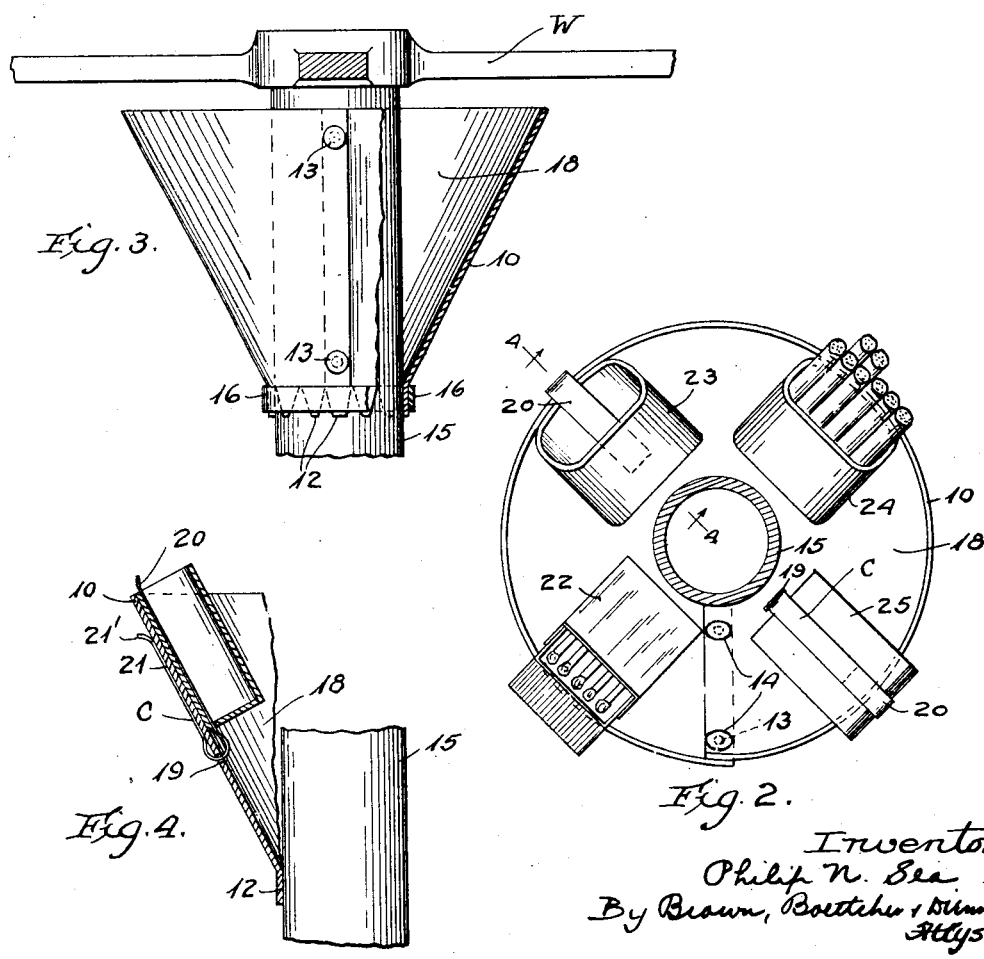
Inventor,
Philip N. Sea
By Brown, Boettcher & Dienner
Attys.

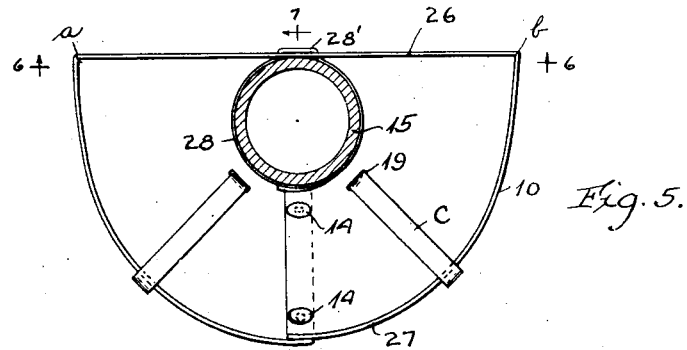
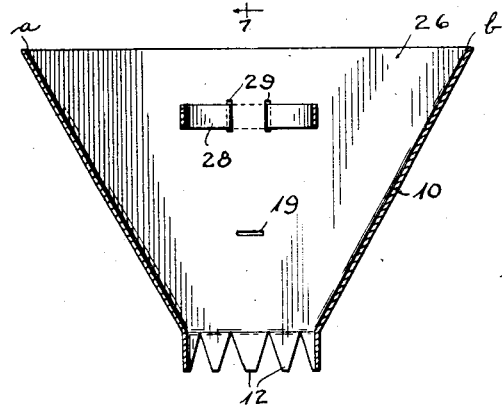
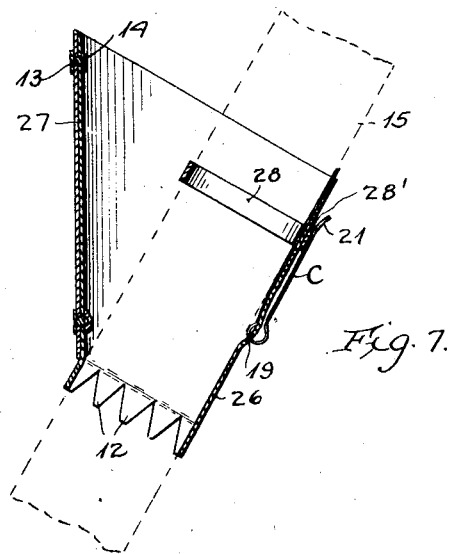

Patented June 11, 1929.

1,717,069

UNITED STATES PATENT OFFICE.

PHILIP N. SEA, OF CHICAGO, ILLINOIS.

AUTOMOBILE STEERING-POST ATTACHMENT.

Application filed June 27, 1927. Serial No. 201,680.

My invention relates to an automobile steering post attachment in the form of a holder or receptacle for the convenient and readily accessible support of smokers' articles, memorandum devices or toilet articles. An important object of the invention is to provide a holder or receptacle structure which can be readily applied to be supported by the steering wheel post at any desired distance below the steering wheel. Another object is to make the holder of sufficient capacity, but of such nature and shape that it will not interfere with the proper manipulation and control of the automobile by the driver.

Another important object of the invention is to construct the holder or receptacle of more or less flexible fabric which may be spread out to flat condition for ready packaging and shipment and which can be readily bent to the proper shape or form and then readily secured in the desired location on the steering post.

Another important object is to form the receptacle or holder of a segmental piece of fabric which can be readily bent and secured to form a holder or receptacle of frusto-conical shape which, at its narrow end, may receive and be secured to the steering post, and whose wider end extends upwardly so that a frusto-conical wall is provided for supporting the various articles and an annular pocket is formed into which objects may be kept or placed. The receptacle may be applied directly below the steering wheel so as to be accessible thru the spaces between the spokes of the wheel, or it may be applied farther down on the steering post, to be accessible from below the steering wheel.

Referring to the drawing:—

Fig. 1 is a plan view of the holder forming fabric before it is applied to the steering post to form the holder;

Fig. 2 is a top view of the holder applied to the steering post;

Fig. 3 is a side elevational view, partly in section, of the holder on the steering post;

Fig. 4 is a sectional view on plane 4—4, Fig. 2;

Fig. 5 is a top view showing a modified arrangement;

Fig. 6 is a sectional view on plane 6—6, Fig. 5; and

Fig. 7 is a sectional view on plane 7—7, Fig. 7.

The fabric or material 10 for forming the holder has primarily the shape of the segment of a circle, as shown in Fig. 1. The material may be leather, fiber, composition imitation leather, or any other suitable material. At the center is the hole 11 around which the material is slitted radially to form the sections of flanges 12. Along one edge of the fabric piece 10 are snap fastener buttons 13, and along the other edge are snap fastener sockets 14, and when the sockets are applied to the buttons the fabric will form the frusto-conical wall or shell, as shown in Fig. 3. Before the fasteners are engaged, the fabric is drawn around the steering post 15, and when so applied the sections or flanges 12 will form a circular segmental flange around the post. To increase the frictional engagement of the flange sections, a strap or clamping band 16 is applied around the sections, as indicated in Fig. 3. When the snappers and band are secured the frusto-conical holder resulting will have the annular pocket 18 and the holder may be applied directly below the steering wheel W or at any desired distance below it. The material of the holder being sufficiently flexible, the holder will not interfere with the movement of the driver's knee or with the proper manipulation and control of the clutch, brake, and other controlling devices.

On the wall of the holder may be applied suitable means for holding in place the various articles to be supported. I have shown U-clips C which are extended through and engage at their bends in the slots 19 cut in the holder wall. The limbs 20 and 21 of these clips engage against the inner and outer sides of the wall, respectively, and between the wall and the limbs the various articles to be supported are placed. I have shown a match box 22, an ash receptacle 23, a cigarette container 24, and a memorandum pad 25 supported by the various clips on the inside of the holder. By means of the limbs 21 other articles may be supported on the outside of the holder wall. To enable an object to be easily inserted under the limbs 20 of the clip, these limbs are extended a distance beyond the upper edge of the holder wall, and the limbs 21 have their ends 21' deflected outwardly so that articles may be readily inserted.

Figs. 5, 6 and 7 show a modified arrangement which may be more desirable where the driver has limited space and is close to the steering post, as for example in the smaller cars. To keep the rear side of the steering post clear, the holder, instead of being the full frustum of a cone, is flattened on its rear side as shown. In order that the shape may be readily acquired, the fabric 10 may be scored along the lines $a$ and $b$ so that it can be readily bent to form, and when the fasteners are secured, there results a holder with the flat rear side 26 and the front wall 27 of part frusto-conical form. The fabric has the hole 11 at its smaller end surrounded by the segments 12 which receive the steering post 15 and engage it with more or less spring or friction action. To securely hold the structure in place with its flat wall against the post, a steel clamping ring or band 28 may be provided. This band may be secured to the holder structure by passing through the slots 29 in the wall 26, and the section 28' of the ring where it passes through the slots may be deflected or offset a distance to allow for the thickness of the wall 26. This offset part also locks the wall 26 and the holder against lateral displacement.

Between the ring or band 28 and the wall 26 a spring clip C may be inserted whose outer leg 21 may serve to hold articles, as for example a match box. Such match box would be thus very securely supported for the striking of matches thereon, and the box being small would not interfere with the driver's knees.

On the slanting wall 27 any number of clips C could be applied for the reception of various articles. As in the arrangement of Figs. 1 to 4, these clips would be anchored in the slots 19.

When the fabric is to be applied, the spring clamp 28 is first opened and applied to the steering post and then the fasteners 13 and 14 are connected, the resulting holder structure being then securely held in place by the clamping ring and the engagement of the sections 12 with the steering post.

I thus provide a very simple and efficient holder structure for various service articles, which holder can be readily adjustably applied to the steering post in an automobile and which will not in anywise interfere with the proper operation of the various controlling elements of the car. By means of holding devices such as the clips shown, articles or containers can be readily applied to the holder wall or removed therefrom. Changes and modifications may be made without departing from the scope of the invention, and I do not therefore desire to be limited to precisely what I have shown.

I claim as follows:—

1. The combination with the steering wheel post of an automobile, of a holder structure comprising a frusto-conical wall receiving and secured to said post at its small end and having its large end up whereby to form an annular receptacle with said post.

2. As an article of manufacture, an attachment for steering wheel posts of automobiles comprising a flexible plate in the form of the segment of a circle having a notch at its axis, and fastening means for securing the radial edges of said plate together to thereby form a frusto-conical holder with a hole at its smaller end for receiving a steering post.

3. A receptacle attachment for steering wheel posts comprising a frusto-conical wall, and clip members on said wall each having inner and outer clamping limbs for detachably supporting articles either on the inside or outside of said wall.

4. A holder attachment for steering wheel posts, comprising a wall of generally inverted frusto-conical shape, the opening at the lower end of said wall being adapted to receive the steering wheel post, a section of said wall being flat for engaging against the post, and a spring clamp anchored to said flat wall section to receive a post to secure the holder thereto.

5. A holder comprising a supporting wall, means for detachably securing said wall to a support, said wall having openings therethrough, and U-shaped spring clip members engaging at their bends in said openings and with their limbs on opposite sides of said wall for supporting articles to said wall on either side thereof.

In witness whereof, I hereunto subscribe my name this 25 day of June, 1927.

PHILIP N. SEA.